United States Patent [19]

Mackay

[11] Patent Number: 4,622,242

[45] Date of Patent: Nov. 11, 1986

[54] OPTICAL FIBRE MANUFACTURE

[75] Inventor: Malcolm D. Mackay, Harlow, England

[73] Assignee: Standard Telephones and Cables Public Limited Company, London, England

[21] Appl. No.: 737,142

[22] Filed: May 23, 1985

[30] Foreign Application Priority Data

Jun. 21, 1984 [GB] United Kingdom ............... 8415866

[51] Int. Cl.$^4$ .............................................. B05D 5/06
[52] U.S. Cl. ..................................... 427/163; 118/404;
118/405; 118/429; 427/164; 427/169; 427/356;
427/358; 427/434.2; 427/434.4; 427/434.5;
427/434.6; 427/434.7
[58] Field of Search ...................... 118/405, 429, 404;
427/163, 356, 358, 434.2, 434.6, 434.7, 434.5,
434.4, 169, 164

[56] References Cited

U.S. PATENT DOCUMENTS

| | | | |
|---|---|---|---|
| 2,748,886 | 6/1956 | Wildebour | 427/434.7 |
| 3,960,530 | 6/1976 | Iyengar | 118/405 |
| 4,073,974 | 2/1978 | Albarino | 427/163 |
| 4,374,161 | 2/1983 | Geyling | 427/434.7 |
| 4,409,263 | 10/1983 | Aloisio et al. | 118/405 |
| 4,522,148 | 6/1985 | Kassahun et al. | 118/405 |
| 4,533,570 | 8/1985 | Iyengar | 118/405 |
| 4,539,226 | 9/1985 | Paek et al. | 118/405 |

FOREIGN PATENT DOCUMENTS 318037 9/1974 Austria .

OTHER PUBLICATIONS

Patent Abstracts of Japan, Unexamined Applications Kokai-No. 56-5342 (Nippon Denshin Denwa Kosha).

*Primary Examiner*—John D. Smith
*Assistant Examiner*—Janyce A. Bell
*Attorney, Agent, or Firm*—Dennis P. Clarke

[57] ABSTRACT

A variable-temperature pressure coating system for optical fibres, particularly for uv-curable primary coatings, includes a gas cylinder (8) for pressurizing a tank (1) of coating material, and a heat exchanger (15) controlling the temperature and thus the viscosity of the coating material supplied to a die chamber (19) through which an optical fibre (18) is passed following drawing. The temperature of the die chamber may also be controlled by the same circuit as the heat exchanger. A valve (14) serves to control flow to the die and to enable priming of the tube (13) by filling with coating material (and removal of air bubbles) prior to supply thereof to the die chamber (19). The system is designed for ease of operator handling together with production of high quality coatings at high speed.

15 Claims, 1 Drawing Figure

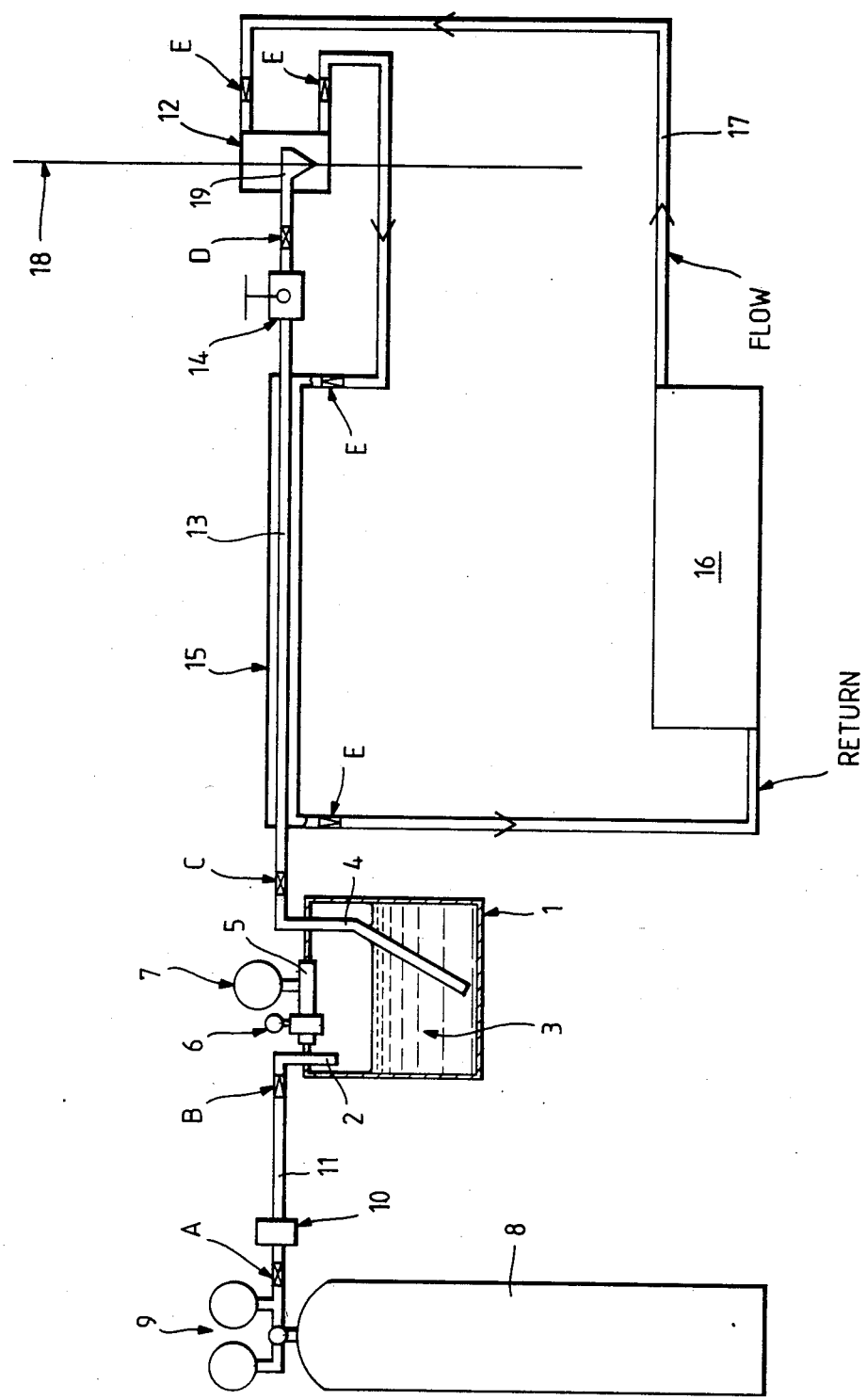

OPTICAL FIBRE MANUFACTURE

BACKGROUND OF THE INVENTION

This invention relates to optical fibre manufacture and in particular to the application of coating resins to optical fibres.

SUMMARY OF THE INVENTION

According to one aspect of the present invention there is provided a method of coating an optical fibre including the step of passing the fibre through a die chamber containing coating material at a predetermined viscosity and pressure, the coating material being supplied to the die chamber from a tank pressurised by a steady pulse-free remote gas pressure source.

According to another aspect of the present invention there is provided a variable-temperature pressure-coating system for use in coating an optical fibre comprising a pressure tank for containing coating material, means for pressurising the tank whereby coating material can be expelled therefrom and coupled to a die chamber following passage through a temperature conditioning tube, through which die chamber the optical fibre is passed in use of the system, and including means for controlling the tube to a temperature consistent with the coating material supplied to the die chamber being at a predetermined viscosity.

According to a further aspect of the present invention there is provided a variable-temperature pressure-coating system for use in high speed coating of an optical fibre in tandem with drawing thereof, comprising a pressurised die in which the fibre is coated, a temperature conditioning tube, a pressure tank containing coating material, means for pressurising the tank whereby to expel coating material therefrom, which expelled coating material is coupled to the die following passage through the tube, means for controlling the tube to a temperature consistent with the coating material supplied to the die being at a predetermined viscosity, and a valve disposed between the tube and the die, whereby before coating material is supplied to the die the tube is filled with bubble-free coating material in order to prevent air or gas reaching the die, and wherein with the system pressurised and the valve closed the die can readily be removed for cleaning or replacement.

BRIEF DESCRIPTION OF THE DRAWINGS

Embodiments of the invention will now be described with reference to the accompanying schematic drawing of a variable-temperature pressurised feed system for optical fibre coating.

DESCRIPTION OF THE PREFERRED EMBODIMENTS

A basic requirement of a pressurised optical fibre coating system is, in view of the lengths of fibre involved, a large capacity reservoir for the coating material in order to accommodate long runs. Some of the primary coating resins employed are radiation cured, and nearly all of these resins require the presence of oxygen or air above the coating material in order to maintain the activity of their stabilisers. Thus the use of a totally closed reservoir chamber, for example comprising a cylinder emptied by means of a piston, would accelerate cure by oxygen/air starvation and would not allow built-in cure inhibitors to work. Additional requirements of a coating system are connected with ease of handling and cleaning by an operator, the minimisation of down time, together with flexibility of use of the system, which amongst other things require that the reservoirs be relatively lightweight.

In the feed system schematically illustrated in FIG. 1 the reservoir is comprised of a stainless steel pressure tank 1. A particularly suitable type is that made of stainless steel type 1.4301 as supplied by Semat (UK) Limited, of St. Albans, Herts, England. These tanks are available in a range of capacities (five liters to thirty-eight liters), are round-bottomed to allow complete emptying and have rubber-coated bases and handles. The illustrated tank 1 has an inlet tube 2 for the application of pressure which serves to force coating material 3 out of tank via an outlet tube 4. In order to fill the tank 1 with coating material 3 a closure member 5 is removed. The closure member 5 may be screwed into a matching threaded bore of the tank 1 or secured in place by a spring clip arrangement, seals being provided to ensure that pressurisation of the tank can be achieved. The closure member includes a valve 6, serving both for air venting, as described hereinafter, and as a safety valve, together with a pressure gauge 7. Typically the maximum operating pressure of such stainless steel tanks is of the order of seven bar. In dependence on the requirements of the coating process in which the tank 1 is employed, a heating/cooling coil (not shown) may be disposed around the tank 1.

The pressure required to force the coating material out of tank 1 is provided by a compressor and buffer tank, illustrated as an air or oxygen (as appropriate to the coating material) cylinder 8 having a conventional valve and gauge arrangement 9 which is illustrated only schematically. A filter 10 (typically 0.2 um) is inserted in line 11, of high pressure tubing, between the cylinder 8 and the inlet tube 2. The purpose of filter 10 is to prevent any dust/dirt from the inside of cylinder 8 entering the coating material 3 and causing a potential fibre breakage point when applied to a fibre.

The outlet tube 4 is coupled to a pressurised coating material applicator die 12 via a tube 13 and a control valve, for example a ball valve, 14. In order to condition (control the temperature of and thus its viscosity) the coating material 3 immediately prior to entry into die 12 via valve 14, the tube 13 extends through a heat exchanger 15. Means indicated at 16 serve to heat or cool heat exchanger fluid, for example, water, to a predetermined (and variable as required in dependence on the particular coating material in use) temperature and pump it around a circuit 17 including the heat exchanger 15 in the direction indicated. For optimum viscosity of some coating materials the pressurised die 12 must also be temperature conditioned and thus the circuit 17 is indicated as including the pressurised die 12. To enable the conditioning to be carried out efficiently the tube 13 is of stainless steel rather than the high pressure tubing used for line 11. The length and diameter of the tube 13 is, at least in part, determined by the coating material flow speed, which is determined by the fibre throughput speed, and the dwell time in the tube which is necessary to ensure that the optimum viscosity of the coating material is achieved. Preferably the joints between the various tube elements are mechanical joints for the safety of both operator and equipment, particularly those at A,B,C and D since the system is under pressure, although those joints at E may alternatively be "quick-connect" joints.

The system is connected up as illustrated and the tank 1 partially filled (up to a maximum of 85% or so). The valve 14 is in a closed position, preventing passage of coating material, and is disconnected at D from the die 12. Means 16 is operated to control the heat exchanger 15 to the appropriate temperature to give the appropriate viscosity for the coating material to be used. When this is achieved the system can be primed ready to start the coating of a fibre (indicated at 18) in tandem with the pulling thereof from a preform (not shown). The die 12 includes a chamber 19 in which the coating material is in use of the system disposed under pressure and through which the fibre passes. The control valve of the cylinder 8 is opened to give the required normal working pressure in the tank 1 to force the coating material up the outlet tube 4, through the tube 13 in the heat exchanger 15 to the valve 14, a suitable container being disposed at the outlet of the valve 14. The valve 14 is opened in order to expel the mixture of air and coating material which initially passes out of tube 13. Valve opening should be carried out slowly to prevent contamination of equipment and operator by the coating material. The valve is left open until bubble-free coating material flows into the container, when the valve is closed and the joint at D made to connect the valve outlet to the die 12. This procedure ensures that bubble-free coating material can be applied to the fibre throughout a run. There should be sufficient coating material in the tank 1 before a run to ensure that the inlet of outlet tube 4 remains covered throughout the run.

When a run is started a freshly pulled bare fibre is threaded through die 12 and with pulling proceeding at the appropriate rate the valve 14 is opened, thus allowing coating material at the correct viscosity and pressure to enter die 12 and come into contact with the bare fibre. If at any time the coating process has to be stopped all that is required is to close the valve 14. For example at the end of one run and with a further run to follow, there being sufficient coating material in the tank, all that is required is to turn off valve 14, disconnect mechanical joint D, remove and clean the die 12 (three to five minutes in a vapour etch cleaner), and subsequently replace the die. (Rather than cleaning the removed die and then replacing it, a fresh die may be substituted, thus speeding up the changeover process). The system is then ready to coat the next fibre. Loss of coating material and operator handling are minimised, and the procedure is quick and safe. The system is suitable for a range of material flow rates associated with a wide range of fibre draw speeds although it was initially intended for the high speed coating of fibres in tandem with drawing thereof on a production line, which drawing processes may run continuously for 24 hours or more, in dependence on the preform size. In such production lines it is important that down time is minimised and that cleaning and handling by operators is facilitated.

In order to return the system to the un-primed initial condition, for example to refill or replace tank 1, the valve 14 is closed, the valve of cylinder 8 is closed and the tank is depressurised by opening valve 6. Tank 1 can be removed following undoing of joints B and C and replaced by another. If desired the tube 13 may be removed, the operator wearing protective clothing, after undoing joints C and D for cleaning in a vapour phase cleaner. The outlet tube 4 is removed from the initial tank 1 and cleaned the same way before reinsertion in the tank. Further coating material can then be decanted into tank 1. Filling of a tank is preferably carried out some time in advance of use of that tank in order to enable air bubbles trapped in the coating material during decanting to work their way to the surface and burst, rather than be transmitted through the system to the fibre. Thus tanks are preferable replaced rather than refilled in situ. The closure member 5 should be left so that the tank is open and free air will keep the coating material in prime condition. The tank may then be stored until required, preferably in a safe place remote from sources that may tend to cure the coating material.

I claim:

1. A method of coating optical fibre including the step of passing the fibre through a die chamber containing coating material at a predetermined viscosity and pressure, the coating material being supplied to the die chamber from a tank pressurized by a steady pulse-free remote gas pressure source, the coating material temperature being controlled to a value consistent with the viscosity required in the die chamber by means of a temperature conditioning tube connected between the tank and the die chamber.

2. A method as claimed in claim 1, wherein the tank is removably connected between the remote gas pressure source on the one hand and the die chamber on the other hand, the method including replacing an exhausted tank with a replenished tank following coating of an optical fibre and prior to coating another optical fibre.

3. A method as claimed in claim 1 wherein the tube extends through a heat exchanger, which heat exchanger is disposed in a circuit including a pump for passing heat exchanger fluid therearound and means for controlling the temperature of the heat exchanger fluid.

4. A method as claimed in claim 1, wherein the die is also disposed in the circuit and its temperature controlled by the heat exchanger fluid.

5. A method as claimed in claim 1, wherein a valve disposed between the tube where it exits the heat exchanger and the die chamber, and including the step of priming the tube before the coating material is supplied to the die chamber, whereby to prevent air or gas bubbles from reaching the die chamber.

6. A method as claimed in claim 5 wherein said priming step comprises disconnecting the valve outlet from the die chamber, closing the valve, pressurising the tank, operating the circuit whereby to heat or cool the tube as appropriate, opening the valve and collecting the coating medium emitted from the valve outlet until the coating medium is bubble-free, closing the valve and reconnecting the valve outlet to the die chamber.

7. A method as claimed in claim 1, wherein the tank is pressurised by a gas cylinder, the gas inlet port to the tank being above the level of the coating material therein, and the tank outlet port being below the level of the coating material whereby to prevent gas bubbles from reaching the die chamber, but permitting exposure of the coating material to the gas.

8. A method as claimed in claim 7, including the step of filtering the gas prior to application thereof to the tank whereby to prevent solid particles from the interior of the gas cylinder reaching the optical fibre.

9. A variable-temperature pressure-coating system for use in coating an optical fibre comprising a pressure tank for containing coating material, means for pressurising the tank whereby coating material can be expelled therefrom and coupled to a die chamber following passage through a temperature conditioning tube, through which die chamber the optical fibre is passed in use of the system, and including means for controlling the tube to a temperature consistent with the coating material supplied to the die chamber being at a predetermined viscosity.

10. A system as claimed in claim 9, wherein the tube extends through a heat exchanger, which heat exchanger is disposed in a circuit including a pump for passing heat exchanger fluid therearound and including means for controlling the temperature of the heat exchanger fluid.

11. A system as claimed in claim 10, wherein the die is also disposed in the circuit whereby its temperature is controlled by the heat exchanger fluid.

12. A system as claimed in claim 10, and including a valve, disposed between the tube where it exits the heat exchanger and the die chamber, for use in controlling the flow of coating material and priming the tube, before coating material is supplied therethrough to the die chamber, by filling the tube with bubble-free coating material, whereby to prevent air or gas from reaching the die chamber.

13. A system as claimed in claim 12, and including a gas cylinder for pressurising the tank, the gas inlet port to the tank being above the level of the coating material therein in use of the system and the tank outlet port being below said level of the coating material, whereby to prevent gas bubbles from reaching the die chamber but permitting exposure of the coating material to the gas.

14. A variable-temperature pressure-coating system for use in high speed coating of an optical fibre in tandem with drawing thereof, comprising a pressurised die in which the fibre is coated, a temperature conditioning tube, a pressure tank containing coating material, means for pressurising the tank whereby to expel coating material therefrom, which expelled coating material is coupled to the die following passage through the tube, means for controlling the tube to a temperature consistent with the coating material supplied to the die being at a predetermined viscosity, and a valve disposed between the tube and the die, whereby before coating material is supplied to the die the tube is filled with bubble-free coating material in order to prevent air or gas reaching the die, and wherein with the system pressurised and the valve closed the die can readily be removed for cleaning or replacement.

15. A system as claimed in claim 14, wherein with the system depressurised the pressure tank is readily demountable from between the pressurising means and the tube whereby to facilitate exchange thereof.

* * * * *